United States Patent Office 3,290,015
Patented Dec. 6, 1966

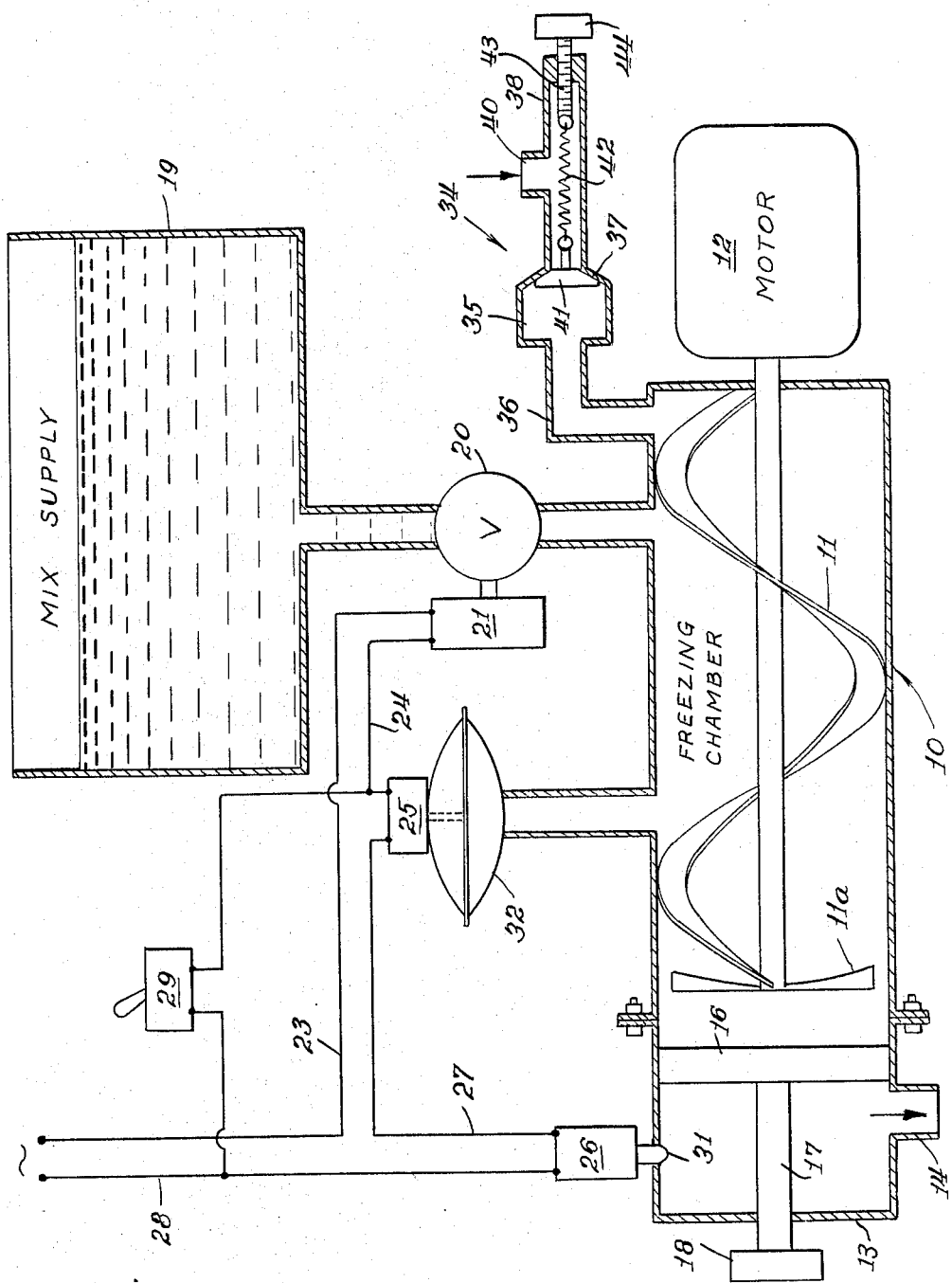

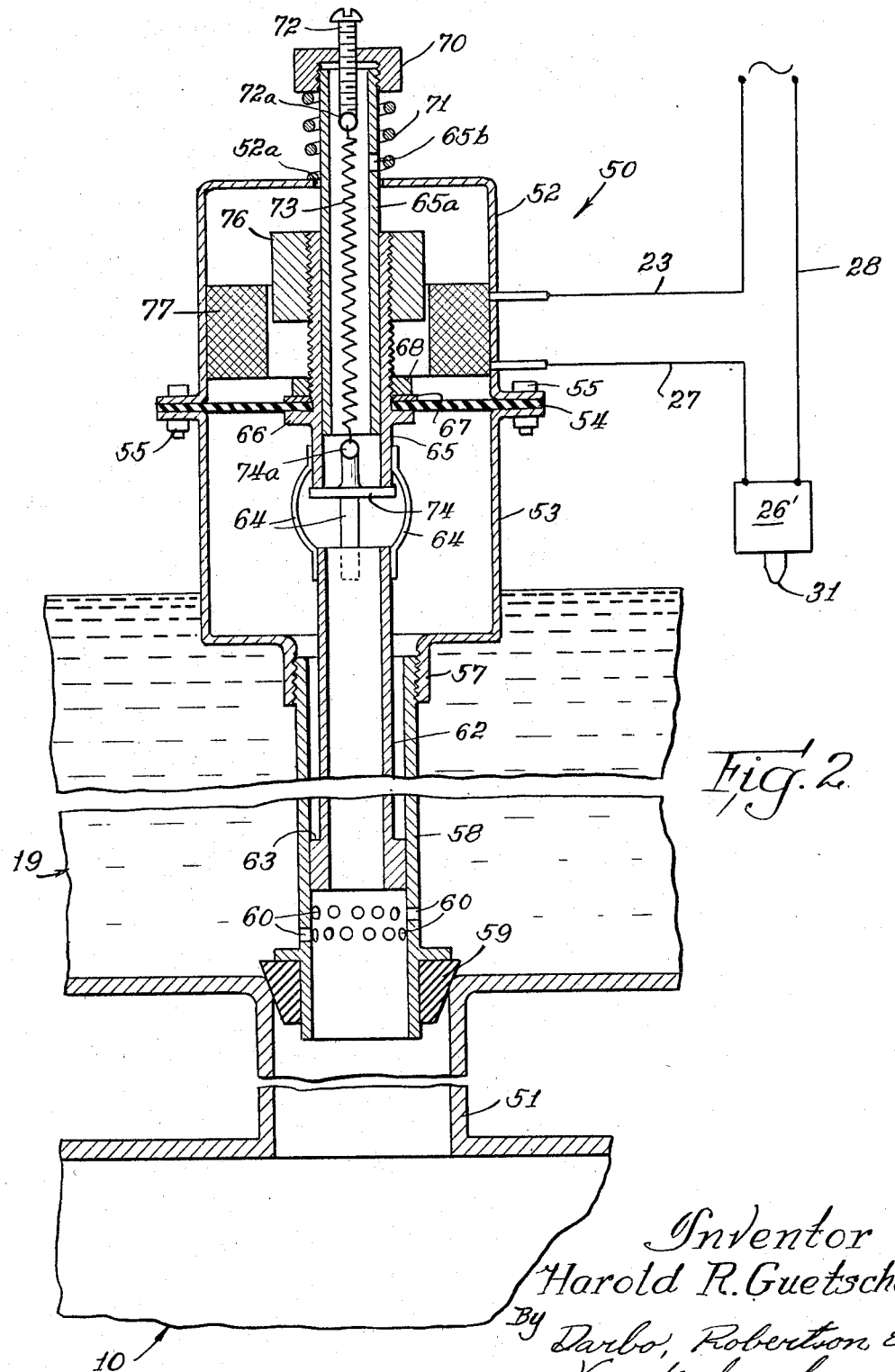

3,290,015
FEED CONTROL FOR WHIPPED FOOD FREEZERS
Harold R. Guetschow, R.F.D. 1, Box 138,
South Beloit, Ill.
Filed June 24, 1964, Ser. No. 377,720
13 Claims. (Cl. 259—9)

This invention relates to a method and apparatus for controlling the supply of mix to the mixing chamber of an apparatus for making a frozen whipped food product.

Whereas historically ice cream was made at a central plant and delivered to the numerous small dealers, drug stores, etc., who dispensed and sold the product, it is becoming increasingly more common for the ice cream to be actually produced at the location at whch it is to be dispensed and sold. These locations have comparatively small whipping and freezing machines which produce the ice cream from a prepared mix and dispense it as the demand requires. Similar machines are employed to produce a product comparable in consistency to a milk shake or a malted milk drink.

Such machines are intended to be more or less automatic in their operation. They have a mixing and freezing chamber. The prepared mix is put into this mixing chamber. In the chamber the mix is chilled to a predetermined temperature, and at the same time, it is mechanically worked to incorporate air therein. The increase in volume caused by the incorporation of air is commonly referred to as overrun. This mixing chamber has a dispensing valve. As the demand requires, the operator opens the valve to draw off product. The early machines were of the batch type and were refilled after being emptied. However, in the more recent machines additional mix is put into the mixing and freezing chamber as the finished product is dispensed so as to maintain a constant supply of product ready for use in the machine.

It is intended that such machines be as automatic as possible so that all the operator has to do is to open and close the dispensing valve, and to occasionally fill a mix supply tank. From the supply tank the mix is introduced into the mixing and freezing chamber as required by the demand. However, one troublesome portion of the apparatus has been in the feed of the mix from the supply tank into the mixing and freezing chamber. Within limits, the apparatus operates best if approximately a given quantity of product is maintained in the mixing and freezing chamber. If too much product is introduced into this chamber, the capabilities of the mixing apparatus and of the refrigeration equipment are overtaxed. This can result in actual damage to the equipment. Conversely, it is obvious that if the quantity in the chamber becomes too small it may not become adequately processed before it is withdrawn, and/or the machine may not keep up with the demand for finished product. Thus it is important that the supply of the prepared mix be such as to maintain approximately a given quantity of product in the mixing and freezing chamber.

One factor that complicates the maintenance of a proper quantity of product in the freezing chamber is the development of overrun therein. Thus, for example, if there is a fifty percent overrun, the volume of the product in the chamber, after the material has been suitably worked, is half again as large as the volume of mix that was introduced into the chamber.

Existing equipment in general suffers from one or the other of two defects. Some of the equipment is so inaccurate that it requires a constant supervision by the operator to insure that, within limits, a proper level of product is maintained in the freezing chamber. In such cases the operator must constantly be readjusting the feed control apparatus to increase or decrease the supply of mix from the supply tank to compensate for low levels or high levels, as the case may be, of product in the chamber. Some apparatus that might seem to solve the problem becomes so complex and complicated that it is not economically justified. Not only is it high in initial cost but its very complexity increases servicing problems.

The principal object of the present invention is to provide a simple but comparatively accurate method and apparatus for controlling the feed of mix from the supply tank to the whipping and freezing chamber of an apparatus of the type described. It has the additional advantage that it is readily adaptable for use with substantially all of the various brands of machines. The only limitation on its adaptability to a particular machine is that the machine be one having a closed whipping and freezing chamber. Since this is true of the commonly used machines, the present invention normally can be employed therewith.

Further objects and advantages will become apparent from the following description taken in conjunction with the drawings in which:

FIGURE 1 illustrates in diagrammatic form a machine for producing a whipped and frozen food product and incorporating the present invention for supplying mix thereto; and FIGURE 2 is a vertical section through an alternative bodiment.

In the method of the present invention control over the quantity of mix to be added to the mixing and freezing chamber is maintained by observing the air pressure within the chamber. Upon the withdrawal of product from the chamber, the air pressure in the chamber will drop as a function of the amount of product withdrawn. The initial step then is to stabilize the air pressure in the chamber to a predetermined value. Thereafter mix is added to the chamber in a quantity sufficient to raise the air pressure in the chamber a given amount above said predetermined value. If the chamber is relatively empty, it will take proportionately more mix to be added to the chamber to increase the pressure therein by said amount. Conversely, if the chamber is already comparatively full, it will take a relatively small quantity of mix to increase the pressure in said chamber by said amount.

For example, assume that the mixer is one in which the mixing is done at atmospheric pressure. In such an event when product is withdrawn from the chamber, the pressure in the chamber will drop below atmospheric, i.e. a vacuum will be created, by an amount that is a function of the quantity of product withdrawn. The pressure in the chamber then is stabilized to a given degree of vacuum. This may be done simultaneously with the withdrawal of product from the chamber, or the steps may be carried out in sequence. Assume, for example, that the amount of vacuum (i.e. pressure differential below atmospheric) was to be stabilized at three inches of mercury. As product is withdrawn from the chamber tending to cause the pressure therein to drop below three inches, air is bled into the chamber to maintain the amount of vacuum at the three inch level. After the completion of the withdrawal of product and the stabilization of the vacuum at three inches, mix is added to the chamber in a quantity sufficient to raise the pressure in the chamber to atmospheric.

While most mixers are of a type that operate at atmospheric pressure, it will be apparent from the description herein that the same principles can be applied to a mixer that operated at a pressure other than atmospheric. For example, to speed the incorporation of air in the mix, or for other reasons, the mixer might do the mixing at a positive pressure of ten pounds (above atmospheric pressure). In that event the stabilization pressure might be chosen as eight pounds. Anytime that product was withdrawn below the eight pound level, air would be introduced into the chamber under pressure to maintain the pressure therein at eight pounds. Upon the completion of the withdrawal and the stabilization of the pressure at eight pounds, then mix would be added to the chamber in a quantity sufficient to raise the pressure therein to ten pounds.

The stabilization pressure is chosen empirically although it might be that those skilled in the art could devise the mathematical formula for determining the amount of pressure. It is an amount such that with the chamber filled to the optimum level, and with an average serving dispensed therefrom, the quantity of mix by weight in said serving when added to the chamber will increase the pressure in said chamber by the difference between said amount and the predetermined mixing pressure. From the manner in which the amount of pressure differential is determined, it would seem that a quantity of product dispensed always must be the same in order to maintain the proper level of product in the freezing chamber. However, this is not the case. Within reasonable limits a larger or smaller quantity of product may be dispensed from the freezing chamber at any one time. To the extent that the level of product within the chamber thus is substantially decreased or substantially increased with respect to what it would be with an average quantity dispensed, there is an automatic adjustment as mix is re-added to the chamber. If the product level in the chamber is substantially decreased, there will be a proportionately greater addition of mix to the chamber. Conversely, if the product level in the chamber is relatively high, the amount of mix added to the chamber will be proportionately lower.

As previously described, machines for making a frozen custard or ice cream type product comprise a whipping and freezing chamber generally 10. Refrigeration means not shown, is provided to chill the walls of chamber 10. A whipper or dasher 11 is rotated in chamber 10 by power means such as a slow speed motor 12. This rotation works the mix in the chamber to incorporate air therein to the desired extent. Additionally, it moves the product about the chilled walls of the container to insure an even and uniform cooling of the product. Controls for motor 12 are not shown since they are conventional. Normally they comprise means to shut the motor off when the product has been adequately worked (usually as determined by the temperature). Provision also may be made to turn the motor on so that blade 11a of dasher 11 forces the product toward and out through the dispensing valve when the valve is open. The dispensing valve 13 is in the form of a tube located at one end of chamber 10 and incorporates a dispensing opening 14. A plunger 16 is mounted in tube 13 and is connected by a rod 17 to a handle 18. With plunger 16 in the position illustrated in the drawing, it blocks the flow of product from the chamber to dispensing opening 14. By moving handle 18 to the left, plunger 16 is moved to the left of opening 14 so that product will flow from the chamber through tube 13 and out opening 14.

As product is withdrawn from chamber 10, the chamber is replenished by mix from tank 19. Control of the flow of mix from tank 19 to chamber 10 is maintained by a valve 20 operated by an electromagnet or solenoid 21. In the present invention the valve 20 is closed when solenoid 21 is de-energized and is opened only upon the energizing of solenoid 21. A wire 23 connects solenoid 21 to a suitable source of electric power. A wire 24 connects solenoid 21 to a switch 25. In turn switch 25 is connected to a switch 26 by a wire 27. Wire 28 connects switch 26 to the source of electric power. A manual override switch 29 also is connected to wires 28 and 24. Switch 29 normally is open but may be closed to energize solenoid 21 independently of switches 25 and 26.

Switch 26 has an operating button 31 positioned to be actuated by plunger 16 when the plunger is moved to the dispensing position. Switch 26 is opened when button 31 is actuated by plunger 16 and is closed when plunger 16 is in the position illustrated in the drawing. Switch 25 is a part of a pressure control apparatus generally 32. Pressure control apparatus 32 communicates with chamber 10 and is adapted to close switch 25 when the pressure within chamber 10 is below a given pressure level and to open switch 25 when the pressure in chamber 10 rises to said level. It includes adjustable means, not shown, by which the exact magnitude of that level may be varied.

Also communicating with chamber 10 is an adjustable air bleeder valve generally 34. It comprises a chamber 35 which communicates with freezing chamber 10 through a conduit 36 and defines a valve seat 37 where chamber 35 connects to tube 38. Tube 38 is open to atmosphere at opening 40. A valve closure 41 cooperates with seat 37 to prevent fluid communication between chamber 35 and tube 38 except when the pressure in chamber 10 drops below a given setting. The magnitude of this setting is determined by the tension on spring 42. At one end spring 42 is connected to closure 41 and at the other end it is connected to an adjustable screw 43 threaded into the closed end of tube 38. Screw 43 has an adjusting knob 44. By moving screw outwardly with respect to tube 38 the tension on spring 42 is increased thus increasing the extent of pressure differential that must exist between atmospheric opening 40 and chamber 10 before closure 41 will be pushed away from seat 37 to bleed air into chamber 10. Conversely, by relaxing the tension on spring 42 the pressure differential that must exist before air will enter chamber 10 from the outside is diminished.

When the illustrated machine is started up, override switch 29 would be closed to open valve 20 for the introduction of the mix into chamber 10. Chamber 10 is vented so that mix will run into the chamber. After chamber 10 is filled to the optimum level, switch 29 would be opened and the vent closed. In the meantime the control means, not shown, for motor 12 would energize the motor to rotate dasher 11. This would work the product. After the product was worked to the requisite extent, it would then be ready to be dispensed through opening 14.

When it is desired to dispense product, handle 18 would be pulled to the left moving plunger 16 to the left end of tube 13. This would permit, in addition to uncovering opening 14 for the dispensing of product, plunger 16 to actuate button 31 of switch 26 to open switch 26. This prevents valve 20 from opening so long as product is being drawn. The drawing of product from chamber 10 creates a vacuum therein. Below atmospheric pressure in chamber 10 closes switch 25, but this has no effect since switch 26 is open. Assuming that the average quantity of material is being drawn, the extent of the vacuum in chamber 10 will be greater than the degree of vacuum for which bleeder valve 34 is set. The manner of arriving at a setting for valve 34 is described hereinafter. As the vacuum in chamber 10 starts to go below the setting of valve 34, air is bled through the valve and into chamber 10 maintaining the chamber at the degree of vacuum for which valve 34 is set.

When plunger 16 is again moved to the right to end the dispensing of product, switch 26 is again closed. Since the pressure in chamber 10 still is at the preset level of vacuum, determined by the setting of bleeder valve 34, pressure control apparatus 32 maintains switch 25 in the closed position. Thus, upon the closing of switch 26 a circuit is established between the two switches 25 and 26, the source of electrical power and solenoid 21. This energizes solenoid 21 to open valve 20. Mix from supply tank 19 now is permitted to enter chamber 10. As it does so, it increases the pressure in chamber 10. When the pressure in chamber 10 again arises to atmospheric pressure (assuming that this is an atmospheric pressure freezer), pressure control apparatus 32 opens switch 25. This interrupts the circuit through solenoid 21 and permits valve 20 to close.

The initial setting of valve 34 can be determined by trial and error, the tension on the spring 42 being increased to increase the level of product in chamber 10 and the tension being released to lower the level of product in chamber 10. However, a more accurate way of achieving the setting of valve 34 would be as follows. As a preface to this discussion, it might be pointed out that most machines of this type are in locations where the size of the average serving (i.e. amount dispensed from the freezer at any one time) is relatively stable. For example, in a small ice cream store, it generally will run to quarts, although there will be some half gallons, pints and cones. On the other hand, in a small ice cream store located in an area readily accessible to a number of school children the proportion of cones would obviously be much higher and might be predominant. Another example might be a frozen custard machine in a particular location, such as a drive-in, where it was used primarily to produce milk shakes and malted milk drinks. If this drive-in used a sixteen ounce cup, the usual size of the serving would be sixteen ounces.

In any event, to calibrate valve 34 one would dispense an average serving from opening 14. By weighing this average serving the amount of mix (from tank 19) in the serving could be determined by the weight. Then starting with chamber 10 filled to the optimum level, valve 34 would be set at a setting at which that quantity of mix would be reintroduced into chamber 10 through valve 20 after an average serving was dispensed through opening 14. Quite obviously valve 34 could be precalibrated to show the proper setting of screw 43 for average servings of various sizes.

With a given setting of valve 34, assume that there was a demand for a quantity of product substantially in excess of what was the average serving. As a result, the quantity of product in chamber 10 would drop substantially lower during a dispensing operation than would normally be the case. This is automatically compensated for by the present invention. Say for example, that valve 34 was set to maintain a pressure below atmospheric, i.e. vacuum, in chamber 10 such that the difference in pressure is equal to three inches of mercury. Also assume that with the particular machine the optimum level of material in the chamber is such as to fill the chamber half full. Under normal demand conditions the chamber would drop in level only slightly below half full as an average serving was dispensed. However, because of the large demand in a single instance, the chamber dropped from half full to a quarter full. Valve 34 would continue to maintain a pressure differential of three inches of mercury between atmospheric and the pressure in chamber 10 just as it did with the relatively smaller fluctuations when the chamber was about half full. However, in order to raise the pressure back to atmospheric, substantially more mix must be introduced into the chamber when the chamber is only a quarter full than is necessary to raise the chamber back to atmospheric pressure when the chamber is half full. Although the chamber will not necessarily return to the optimum level immediately after a large draw, it will approach it, and after a few more servings will restabilize itself.

It will be seen that the opposite also is true. If, for some reason, chamber 10 should begin to get too full, the amount of product that would be necessary to change the pressure in the chamber from a three inch vacuum to atmospheric pressure would be relatively small as compared to that required at the optimum conditions for which valve 34 was set. Thus a relatively minor amount of product would be introduced into chamber 10 upon each dispensing actuation of the dispensing valve 16 if the chamber already was too full.

This automatic compensation for size of draw will work most satisfactorily so long as the normal demand condition is stabilized and the excessively large or small servings do not have the effect of changing what is the "normal demand condition." If there is, in effect, a change in the normal demand, it will usually be desirable to reset valve 34. As previously described, the tension on spring 42 is increased to increase the degree of vacuum (lower the absolute pressure) and increase the level of product in chamber 10, and the tension on the spring is decreased to decrease the degree of vacuum (raise the absolute pressure) and to lower the level of product in chamber 10.

FIGURE 2 illustrates an alternative embodiment having a combined air and mix feed valve generally 50 employed in conjunction with freezing chamber 10 and mix supply tank 19. In this embodiment the mixing chamber 10 does not have the pipe 36 thereon for the air feed valve, nor does it have a pressure operated switch 32. A pipe 51 forms a direct connection between mix supply tank 19 and freezing chamber 10. In other respects the embodiment of FIGURE 2 corresponds to that of FIGURE 1 except for the addition of valve 50.

Valve 50 comprises an upper and lower housing 52 and 53 respectively separated by a rubber or synthetic rubber diaphragm 54 and connected by bolts 55. Lower housing 53 has an internally threaded boss 57 into which is threaded a pipe 58. A stopper 59 of rubber or synthetic rubber fits about the lower end of pipe 58 and forms a seal between pipe 58 and the opening in the bottom of mix supply tank 19 at the point at which pipe 51 communicates with the tank. Pipe 58 has a plurality of small openings 60 through the wall to permit the flow of mix from tank 19 into pipe 51.

A lower valve tube 62 is mounted for vertical movement within pipe 58 and has a boss 63 which serves as a valve closure for openings 60 when the valve tube is lowered from the position illustrated in FIGURE 2. A plurality of straps 64 connect the upper end of lower valve tube 62 with the lower end of upper tube 65. Upper tube 65 has a shoulder 66 and is threaded above that shoulder. A washer 67 and a nut 68 are slipped over the upper end of upper tube 65 with the nut being turned down onto the tube so that diaphragm 54 is clamped between shoulder 66 and washer 67.

Upper tube 65 has an upwardly extending extension 65a which is secured to and forms a part of upper tube 65. Extension 65a extends through an opening 52a in the top of upper housing 52. A cap 70 is threaded onto the top of extension 65a. A spring 71 is in compression between the top of upper housing 52 and the under side of cap 70. Spring 71 holds the valve tubes in the raised position illustrated in FIGURE 2.

An adjusting screw 72 is threaded through the top of cap 70 and has a ring 72a on the bottom end thereof. A spring 73 is held in tension between ring 72a and a ring 74a extending upwardly from and forming a part of valve closure 74.

An armature 76 is threaded onto the top of upper tube 65 and is positioned in operative association with a solenoid 77 secured to upper housing 52. Solenoid 77 is connected to wires 23 and 27, since switch 25 and solenoid 21 are omitted.

In the operation of the apparatus of FIGURE 2 the valve 50 is removed from the apparatus during startup, or at the commencement of operations. Sufficient mix is poured into tank 19 to fill freezing chamber 10 to the desired level, say two-thirds full. It is whipped and mixed in the freezing chamber to the desired consistency. A draw-off of several typical servings is made to insure that the apparatus is operating satisfactorily.

Thereafter valve 50 is inserted with stopper 59 forming a fluid-tight seal between tank 19 and pipe 58. Tank 19 then is filled with mix. Despite the fact that openings 60 are unobstructed, the mix will not flow from tank 19 through openings 60 so long as the freezing chamber 10 is at approximately atmospheric pressure (and so long as there is no way for air to escape from mixing chamber 10). To achieve this, holes 60 should be relatively small, although the exact diameter of the holes is not particularly critical as long as they are not too large. Holes having a diameter of 3/32 or even 1/8 of an inch work very well. While they can be as small as at least 1/16 of an inch, the small size of the holes reduced the speed of flow.

When a draw-off is made from chamber 10, switch 26' is closed thereby energizing solenoid 77. Solenoid 77 attracts armature 76 pulling the valve tubes 62 and 65 downwardly against the resistance of spring 71. Diaphragm 54 permits this downward movement. The extent of the downward movement is such that valve closure 63 covers openings 60 to prevent any mix from flowing through those openings into the mixing chamber. As in the embodiment of FIGURE 1, the pressure drop or vacuum within chamber 10 is stabilized at a given value below atmospheric pressure by air being admitted through opening 65b past valve closure 74, through lower tube 62, pipe 51, and into chamber 10. The stabilizing value is determined by the tension of spring 73 holding valve closure 74 against the bottom of upper tube 65. This tension, of course, can be varied by changing the position of adjusting screw 72.

When the draw-off is completed, plunger 16 is returned to the FIGURE 1 position, thus opening switch 26'. The opening of switch 26' deenergizes solenoid 77 and the valve tubes 62 and 65 again are raised to the FIGURE 2 position by spring 71. Openings 60 are now uncovered. Because of the vacuum still existing in chamber 10, mix will flow from tank 19 through openings 60 and into the mixing chamber 10 until the pressure in the mixing chamber reaches approximately atmospheric pressure. At about atmospheric pressure (the exact figure will vary slightly depending upon the size of the openings 60, the viscosity of the mix, etc.) a stabilized situation will be achieved at which the mix no longer will flow through the openings 60. This stabilized pressure will, for all practical purposes, be the same following each draw-off. Within the size limits of the feed tanks on conventional apparatus, it will not change significantly with a change in the amount of "head," i.e. depth of mix in the mix supply tank.

I claim:

1. In the method of preparing a whipped food product wherein a mix is introduced into a closed mixing chamber in which the mix is chilled and worked to incorporate air therein and from which chamber the food product is withdrawn as required, the improvement comprising: prior to replenishing said chamber with mix after a draw-off of product, limiting the amount of vacuum produced by a draw-off by the admission of air as required to achieve said limiting, and thereafter adding mix until the pressure in said chamber increases to a predetermined extent.

2. In the method of preparing a whipped food product wherein a mix is introduced into a closed mixing chamber in which the mix is chilled and worked to incorporate air therein and from which the food product is withdrawn as required in amounts which usually are approximately a predetermined quantity by volume, said method comprising the steps of: determining a mixing pressure for said chamber; determining an optimum mixing level for said chamber; determining to what pressure the chamber is reduced by the withdrawal of said quantity of product; determining what amount of difference between the mixing pressure and the reduced chamber pressure is achieved by the addition to said chamber of mix substantially equal in weight to the weight of said quantity; each time that product is withdrawn from said chamber to an extent such that the pressure therein decreases by more than said amount, adding air into said chamber to hold the pressure difference to said amount; and after each withdrawal adding mix until the chamber pressure is raised to said mixing pressure.

3. In the method of preparing a whipped food product wherein a mix is introduced into a closed mixing chamber in which the mix is chilled and worked at about atmospheric pressure to incorporate air therein and from which chamber the food product is withdrawn as required in amounts which usually are about a predetermined quantity by volume, with the chamber preferably being filled to approximately a given level with mix and product, said method comprising the steps of: withdrawing product from said chamber when filled to approximately said level, adding mix to said chamber in an amount substantially equal in weight to the weight of the withdrawn product and determining the degree of vacuum then existing in the chamber; each time thereafter that product is withdrawn from said chamber to an extent that the vacuum in the chamber increases to greater than said degree of vacuum, bleeding air into said chamber to hold the vacuum to said degree of vacuum; and after each withdrawal adding mix until the chamber pressure is raised approximately to atmospheric.

4. The method of claim 3 wherein said degree of vacuum is raised and lowered to raise and lower the level of mix and product in the chamber.

5. The method of claim 3 wherein said degree of vacuum is raised and lowered to compensate for increases and decreases in the quantity of product drawn as compared to said predetermined quantity.

6. In an apparatus for preparing a whipped food product having a closed mixing chamber into which mix is introduced from a supply source and having means in said chamber to chill the mix and the work the mix to incorporate air therein and a discharge valve communicating with said chamber for the withdrawal of product from the chamber as required, the improvement comprising: first means connected between said source and said chamber and connectable to said valve to prevent the flow of mix into said chamber when said valve is open; and second means connected to said chamber to bleed air into said chamber as required to prevent the pressure in said chamber dropping below a predetermined amount; said first means being effective upon the closing of said valve to add mix to said chamber until the pressure therein is raised by a predetermined amount.

7. An apparatus as set forth in claim 6 wherein said second means includes a pressure control valve set to bleed air into said chamber when the pressure therein is lower than a given amount of vacuum and to stop the entrance of air when the pressure rises to said amount.

8. An apparatus as set forth in claim 7, wherein said pressure control valve is adjustable to enable the user to selectively vary the setting of said given amount.

9. An apparatus as set forth in claim 7, wherein said firstmeans includes an electric valve between said supply and said chamber, a first switch operatively connectable to the discharge valve, to be actuated thereby when said valve is in discharge position, a second switch activated by the pressure in said chamber, and circuit means connecting said switches and said electric valve.

10. An apparatus as set forth in claim 8, wherein said first means includes a passageway from said source to said chamber, and a device in said passageway dividing said passageway into a plurality of small openings.

11. An apparatus as set forth in claim 10, wherein said first means includes a valve closure movable between a first position at which said openings are closed and a second position at which said openings are open, an armature member and a solenoid member, one of said members being fixed, the other of the members being movable with respect to the one and operatively connected to said closure to move said closure from one position to the other, and means operatively connected to said closure to urge said closure in the direction in which said closure moves from said other position toward said one position.

12. An apparatus as set forth in claim 6, wherein said first means includes a pasageway from said source to said chamber, and a device in said passageway dividing said passageway into a plurality of small openings.

13. In an apparatus for preparing a whipped food product having a closed mixing chamber into which mix is introduced from a supply source and having means in said chamber to chill the mix and to work the mix to incorporate air therein and a discharge valve communicating with said chamber for the withdrawal of product from the chamber as required, the improvement comprising: first means including a passageway from said source to said chamber, a device in said passageway dividing said passageway into a plurality of small openings, and a device to close said passageway when said valve is open; and second means connected to said chamber to bleed air into said chamber as required to prevent the pressure in said chamber from dropping below a predetermined amount.

References Cited by the Examiner
UNITED STATES PATENTS 2,698,163  12/1954  Swenson _____ 259—9
2,737,024  3/1956  Swenson.

WALTER A. SCHEEL, *Primary Examiner.*

J. M. BELL, *Assistant Examiner.*